United States Patent [19]

Cohen

[11] 4,218,498

[45] Aug. 19, 1980

[54] PROCESS FOR PREPARING A POLYMERIC FILM

[75] Inventor: David L. Cohen, Runcorn, England

[73] Assignee: Imperial Chemical Industries Limited, London, England

[21] Appl. No.: 605,889

[22] Filed: Aug. 19, 1975

[30] Foreign Application Priority Data

Aug. 21, 1974 [GB] United Kingdom ............ 36739/74

[51] Int. Cl.$^2$ ............................................ B05D 3/10
[52] U.S. Cl. .................................... 427/336; 427/340; 427/385.5; 427/387; 427/388.5; 427/407.1; 427/409
[58] Field of Search .............. 427/340, 385, 421, 336, 427/307, 385 R, 407 R, 409, 388 D; 252/109

[56] References Cited

U.S. PATENT DOCUMENTS

| 2,699,403 | 1/1955 | Courts .................................. 427/421 |
| 2,870,041 | 1/1959 | Waddle et al. ........................ 427/341 |
| 2,944,920 | 7/1960 | Shields ................................. 427/421 |
| 3,440,063 | 4/1969 | Chestochowski et al. .......... 427/421 |
| 3,620,820 | 11/1971 | Hess ..................................... 427/421 |
| 3,639,147 | 2/1972 | Benefiel et al. ..................... 427/385 |
| 3,716,393 | 2/1973 | Baker et al. ......................... 427/421 |
| 3,736,172 | 5/1973 | Delano et al. ....................... 427/421 |
| 3,816,164 | 6/1974 | Pepe et al. .......................... 427/385 |
| 3,900,606 | 8/1975 | Mandell ............................... 427/421 |

FOREIGN PATENT DOCUMENTS 1088533 1/1965 United Kingdom .

OTHER PUBLICATIONS

Moilliet et al., *Surface Activity*, N.Y. Van Nostrand Co., 1961, pp. 3 and 244–245.

*Primary Examiner*—John D. Smith
*Assistant Examiner*—Janyce A. Bell
*Attorney, Agent, or Firm*—Cushman, Darby & Cushman

[57] ABSTRACT

A method of preparing a polymeric film comprising the steps of applying a layer of solution of the polymer in a volatile solvent therefor to a support, heating the solution to evaporate at least part of the solvent and, before the polymer is dry, applying to the surface of the polymer layer a surfactant which is soluble in the polymer solution.

5 Claims, No Drawings

PROCESS FOR PREPARING A POLYMERIC FILM

This invention relates to polymeric films and to a process for the preparation thereof.

Polymeric films are often formed by the deposition and spreading of a solution of a polymeric material in a suitable solvent upon a support, followed by evaporation of solvent so that the film hardens. Hardening of the film is often accelerated by the application of heat, although it is usually found that gradual increase in the temperature is usually preferable to a rapid rise to the final drying temperature because an initial period at a lower temperature tends to aid the release of bubbles (apparently of air entrained during the spreading or preparation of the solution) without permanent damage to the film surface. An immediate rise to the final drying temperature without a preliminary drying step at a lower temperature or a gradual increase in temperature tends to produce a film having an irregular surface, apparently caused by the surface drying and hardening rapidly, with consequent permanent deformation of the surface as bubbles escape or are captured beneath it. The problem is particularly serious with thick films, i.e. in the region of 20 to 40 thou (thousandths of an inch) dry film thickness.

It is usual, therefore, to include in film forming processes as explained above, a drying period at a lower temperature than the final temperature to remove as much as possible of air entrapped within the film before the surface hardens. This is time consuming; for example an ethanolic solution of a vinyl acetate/vinyl pyrrolidone copolymer deposited at 40 thou wet thickness on a metal sheet support may require drying conditions of 60° C. for 2 hours and then finally at 85° C. for 1 hour at ambient temperature.

We have now found that if a suitable surfactant is applied to the surface of the freshly deposited wet film, or indeed in many cases to the partially or even completely dried film, release of the bubbles is facilitated or, where they have caused surface irregularities such irregularities may be removed to some degree and the surface improved and flattened. Further, we have found that by application of the surfactant at the appropriate time it is often possible to heat dry the film by raising its temperature to the usual final drying temperature without using a preliminary low temperature drying step.

In our embodiment, therefore, the invention provides a method of preparing a polymeric film comprising the steps of applying a solution of a polymer in a voltaile solvent therefor to a support, heating the solution to evaporate at least part of the solvent and applying to the surface of the polymer layer before, during or after the evaporation phase a surfactant (surface active agent).

The polymer may be any polymeric material capable of forming a layer upon a support from a solution of the polymer upon evaporation of the solvent. Preferably the polymer will be a film-forming polymer (i.e. a polymer capable of forming a film which if of sufficient thickness is self supporting).

Evaporation of the solvent should proceed at a temperature such that there is no adverse effect upon the polymer itself. Numerous examples of polymers and their solvents are known and selection of a suitable combination will present no difficulty to the skilled man; examples are:

| Polymer | Solvent |
|---|---|
| Nylon copolymers (e.g. ICI Maranyl D100, BASF Ultramid 1C) | alcohol |
| Cellulose triacetate | methylene chloride |
| Polyvinyl alcohol | water |
| Polyvinyl acetate | alcohol |
| Polyvinyl pyrrolidone | water or alcohol |

Application of the polymer solution to the support surface to form a sheet or film may be by any suitable means, including spraying, roller coating and other known coating techniques.

Evaporation of the solvent is conveniently carried out at a temperature above ambient, preferably sufficiently high to effect removal of the solvent at a suitable rate without adversely affecting the polymer film. A typical final drying temperature for ethanol is in the range 55° C. to 95° C. The precise temperature chosen will obviously depend upon the boiling point of the solvent, and conveniently will be within 5° C. to 10° C. of the boiling point under the drying conditions employed. Preferably it will not exceed the boiling point of the solvent.

The surfactant employed may be any surfactant sufficiently compatible with the polymer and its solvent to an extent which will not disadvantageously affect the resulting film or plate. Many surfactants are known and selection can be made easily on the basis of simple trial.

Where the surfactant itself is liquid, and of appropriate viscosity for convenient application it may be used as such, but preferably the surfactant will be employed in the form of a solution in a suitable solvent. Again the choice of a solvent will depend upon the polymer and solvent to which it will be applied, since it should not have any adverse effect upon any other material being employed. It may be the same solvent as that used for the polymeritself, it may be a component of said solvent; or it may be a different solvent from that used for the polymer.

Preferably the surfactant is soluble in the polymer solution, conveniently at a concentration within the range 0.05 to 1.0%, preferably 0.1 to 0.5% in a polymer solution of 50% polymer concentration. The concentration of the surfactant in the solution thereof will be such that it has the desired advantageous effect upon the preparation of the film or sheet. Usually it will be present in a concentration from 1 part to 100 parts by weight per 100 parts of solution, conveniently from 2 parts to 50 parts by weight per 100 parts of solution and preferably from 5 parts to 25 parts by weight per 100 l parts of solution.

Surfactants suitable for use in the invention include polysiloxanepolyoxyalkylene (silicone-polyether) copolymers. Products of this type are well known in the art and comprise a methylpolysiloxane portion which may be linear or branched with a molecular weight of up to 10,000, and attached thereto one or more polyoxyalkylene blocks of molecular weight up to 3,000, composed of oxyethylene units or of oxyethylene units together with oxy-1,2-propylene units. The polyoxyalkylene blocks may be attached to a silicon atom at any point in the polysiloxane block via a Si-O-C or a Si-A-O-C linkage, where A is a linking group, e.g. an alkylene, alkylene carbonyl group, or a divalent group consisting of C, H and O, the O being present as ether oxygen. Products with molecular weights of up to 30,000 are suitable, but products with molecular weights below 10,000 are preferred in many cases.

A preferred class of such copolymers has the general formula:

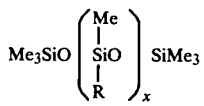

where

R is $(A)_p(OCH_2CHR^1)_yOR''$

A is as defined above, p is 0 or 1, $R^1$ is H or Me and the ratio of units in which $R^1$ is H to units in which $R^1$ is Me > 1:2

R'' is methyl or acetoxy

Particularly preferred are those copolymers in which x=1, y=3–10, p=1, $R^1$ is H and R'' is methyl.

Application of the surfactant to the surface of the solution of the film-forming polymer may be effected at any convenient time. Thus, it may be applied at the beginning of the drying phase, so that a layer of surfactant forms on the surface of the polymer solution, it may be applied continuously through part or all of the drying phase, or it may be applied towards or at the end of the drying phase when the surface of the film-forming polymer is hardening and becoming resistant to passage of bubbles. We prefer to apply the surfactant to the polymer during the drying phase, particularly while the polymer is hot since flow is thereby facilitated.

As mentioned above we have also found it advantageous on occasion to apply the surfactant to the hardened surface of a partially dried polymer film, since some improvement of the surface may occur if the surfactant is selected so that it is capable of dissolving or softening the hardened polymer surface and allowing it to reform to a smoother configuration.

Application of the surfactant or surfactant solution to the polymer may be by any convenient means, we prefer to apply the surfactant or surfactant solution by spraying it using an atomiser whereby very small droplets are produced which fall evenly upon the surface of the polymer. Preferably the surfactant employed is not of greater density than the polymer coating composition and preferably also is of relatively low voltaility compared with the polymer solvent.

The amount of surfactant applied will, of course, be determined by trial, but usually we employ between 0.1 g and 10 g of the surfactant (or solution thereof) per square meter, preferably 1 g to 5 g per square meter.

The invention is particularly applicable to the production of printing plates, which involve the formation of a film or sheet of polymeric material having a surface which is smooth and even.

The invention is illustrated by the following Examples among which Example 2 is included to show that the presence of a surfactant in the polymer solution does not have the same beneficial effect upon the surface finish as the process of the present invention. It is common practice to include in coating compositions a surface active material to improve the flow over the support on which the film is cast or to act as viscosity modifiers, but the Examples show that the presence of such surfactants is not so effective in aiding bubble release as is surfactant applied according to the invention.

EXAMPLE 1

A coating solution was prepared containing:

|  | Parts by weight |
|---|---|
| Copolymer 1:1 vinyl pyrrolidone/vinyl acetate | 100 |
| Ethylene glycol dimethacrylate | 20 |
| Dimethyl phthalate | 10 |
| Benzophenone | 2.5 |
| Ethanol | 67 |

This solution was coated on to a metal sheet using a doctor blade to give a wet layer thickness of 60 thou. The coated plate was then put into a drying oven at 85° C. and left to dry for 2 hours. The polymer surface of the dried coated plate was blistered and cratered due to passage of bubbles of air and solvent vapour through the hardened surface of the polymer.

EXAMPLE 2

Example 1 was repeated except that a siloxane-/polyether surfactant was included in the coating composition in 0.6% w/weight of polymer concentration. Some slight reduction in blistering and cratering occurred but surface irregularities were still present.

EXAMPLE 3

Example 1 was repeated, except that during the drying period the surface of the plate was sprayed with a mist of a 20% by weight solution in IMS of the surfactant used in Example 2.

The resulting dried plate showed no surface irregularities.

EXAMPLE 4

Example 3 was repeated, except that spraying with surfactant was not carried out until the surface of the plate was hardening and already showing blistering and cratering. The polymer surface softened again and finally dried to a smooth finish.

EXAMPLE 5

Example 4 was repeated using a spray consisting only of the solvent (i.e. IMS) but no surfactant. Only a very slight reduction in surface blistering or cratering was observed.

EXAMPLE 6

A coating was prepared as described in Example 1 except that during the drying period the surface of the plate was sprayed with a mist of a 10% by weight solution of Lissapol N in IMS.

The resulting dried plate showed no surface irregularities.

What I claim is:

1. A method of preparing a polymeric film comprising the steps of applying a layer of solution of the polymer in a volatile solvent therefor to a support, heating the solution to evaporate at least part of the solvent and, before the polymer is dry, applying to the surface of the polymer layer a surfactant which is soluble in the polymer solution.

2. A method according to claim 1, in which the surfactant is applied to the surface of the polymer layer after at least part of the polymer solvent has evaporated.

3. A method according to claim 1, in which the surfactant is applied in the form of a solution in a suitable solvent.

4. A method according to claim 3 in which the solvent is a solvent for the polymer.

5. A method according to claim 1 in which the surfactant is a siloxane.

* * * * *